US 7,602,941 B2

(12) United States Patent
Xie et al.

(10) Patent No.: US 7,602,941 B2
(45) Date of Patent: Oct. 13, 2009

(54) COMPONENT FUSION FOR FACE DETECTION

(75) Inventors: Binglong Xie, Bethlehem, PA (US); Dorin Comaniciu, Princeton Jct., NJ (US); Visvanathan Ramesh, Plainsboro, NJ (US); Markus Simon, Buckenhof (DE)

(73) Assignees: Siemens Corporate Research, Inc., Princeton, NJ (US); Siemens Aktiengesellschaft, Munich (DE)

( * ) Notice: Subject to any disclaimer, the term of this patent is extended or adjusted under 35 U.S.C. 154(b) by 940 days.

(21) Appl. No.: 10/842,802

(22) Filed: May 11, 2004

(65) Prior Publication Data
US 2005/0001013 A1 Jan. 6, 2005

Related U.S. Application Data

(60) Provisional application No. 60/470,578, filed on May 14, 2003.

(51) Int. Cl.
*G06K 9/00* (2006.01)
*G06K 9/62* (2006.01)
*H04N 9/47* (2006.01)
*H04N 5/225* (2006.01)

(52) U.S. Cl. ............ 382/103; 382/115; 382/159; 382/203; 348/77; 348/135; 348/169

(58) Field of Classification Search .......... 382/103, 382/104, 118, 159, 160, 203; 348/77, 135, 348/169–172
See application file for complete search history.

(56) References Cited

U.S. PATENT DOCUMENTS

| 6,137,909 A * | 10/2000 | Greineder et al. ........... 382/190 |
| 6,301,370 B1 * | 10/2001 | Steffens et al. ............. 382/103 |
| 6,609,093 B1 * | 8/2003 | Gopinath et al. ............ 704/236 |
| 7,099,510 B2 * | 8/2006 | Jones et al. ................. 382/225 |

OTHER PUBLICATIONS

Paul Viola and Michael Jones, "Rapid Object Detection using a Boosted Cascade of Simple Features", 2001, IEEE Computer Vision and Pattern Recognition, vol. 1, pp. 511-518.*
Bernd Heisele, Thomas Serre, Massimiliano Pontil and Tomaso Poggio, "Component-based Face Detection", 2001, IEEE Computer Society Press, vol. 1, pp. 657-662.*

(Continued)

*Primary Examiner*—Daniel G Mariam
*Assistant Examiner*—Manav Seth
(74) *Attorney, Agent, or Firm*—Donald B. Paschburg; F. Chau & Associates, LLC

(57) ABSTRACT

A system and method for object detection are provided where the system includes a component detection unit for detecting components in an image, a component fusion unit in signal communication with the component detection unit for fusing the components into an object, and a CPU in signal communication with the detection and fusion units for comparing the fused components with a statistical model; and the method includes receiving observation data for a plurality of training images, forming at least one statistical model from the plurality of training images, receiving an input image having a plurality of pixels, detecting a plurality of components in the input image, determining a fusion of the detected components, comparing the fusion with the statistical model, and detecting an object in accordance with the comparison.

27 Claims, 6 Drawing Sheets

OTHER PUBLICATIONS

Burl, M.C.; Perona, P.; "Recognition of planar object classses"; Computer Vision and Pattern Recognition, 1996. Proceedings CVPR'96, 1996 IEEE Computer Society Conference on.*

Article entitled "Component Fusion for Face Detection in the Presence of Heteroscedastic Noise" by Binglong Xie et al.

Article entitled "The Boosting Approach to Machine Learning An Overview" by Robert E. Schapire, Dec. 19, 2001, pp. 1-23.

Article entitled "Finding Human Faces with a Gaussian Mixture Distribution-Based Face Model" by Tomaso Poggio et al., pp. 437-446.

Article entitled "Statistical models of appearance for medical image analysis and computer Vision" by T.F. Cootes et al., pp. 236-248.

Article entitled "Robust Real-time Face Detection" by Paul Viola et al., pp. 747.

Article entitled "Finding Faces in Cluttered Scenes using Random Labeled Graph Matching" by T.K. Leung et al., pp. 637-644.

Article entitled "Advances in Component-based Face Detection" by Stanley M. Bileschi et al.

Article entitled "Component-based Face Detection" by Bernd Heisele et al., pp. I-657-I-662.

* cited by examiner $$L = \prod_{i=1}^{N} \left[ A_i(\mathbf{x}_i) \frac{1}{|2\pi C_i|^{\frac{1}{2}}} \exp\left(-\frac{1}{2}(\mathbf{x}'_i - \mathbf{m}_i)^T C_i^{-1} (\mathbf{x}'_i - \mathbf{m}_i)\right) \right] \quad (1)$$

$$Q_i = \frac{\sum_{\mathbf{x} \in B} \left[ A_i(\mathbf{x})(\mathbf{x} - \mu_i)(\mathbf{x} - \mu_i)^T \right]}{\sum_{\mathbf{x} \in B} A_i(\mathbf{x})} \quad (2)$$

$$A_i(\mathbf{x}) = s_i \exp\left(-\frac{1}{2}(\mathbf{x}_i - \mu_i)^T Q_i^{-1} (\mathbf{x}_i - \mu_i)\right) \quad (3)$$

$$\ln L = \sum_{i=1}^{N} \left[ \ln s_i - \frac{1}{2} \ln |2\pi C_i| \right] - \frac{1}{2} d^2 \quad (4)$$

$$d^2 = \sum_{i=1}^{N} |\mathbf{x}'_i - \mathbf{m}_i|^2_{C_i} + \sum_{i=1}^{N} |\mathbf{x}_i - \mu_i|^2_{Q_i} \quad (5)$$

$$= \sum_{i=1}^{N} (\mathbf{x}'_i - \mathbf{m}_i)^T C_i^{-1} (\mathbf{x}'_i - \mathbf{m}_i) + \sum_{i=1}^{N} (\mathbf{x}_i - \mu_i)^T Q_i^{-1} (\mathbf{x}_i - \mu_i) \quad (6)$$

$$\mathbf{x}' = sR(\mathbf{x} - \mathbf{x}_0) \quad (7)$$

$$R = \begin{pmatrix} \cos\theta & \sin\theta \\ -\sin\theta & \cos\theta \end{pmatrix} \quad (8)$$

$$d^2 = \sum_{i=1}^{N} |\mathbf{x}'_i - \mathbf{m}_i|^2 \quad (9)$$

$$\theta = \arctan \frac{\sum m_i \sum y_i - \sum n_i \sum x_i - N \sum (m_i y_i - n_i x_i)}{\sum m_i \sum x_i + \sum n_i \sum y_i - N \sum (m_i x_i + n_i y_i)} \quad (10)$$

TABLE A.

$$s = \frac{N \sum (\mathbf{m}_i^T R \mathbf{x}_i) - (\sum \mathbf{m}_i^T) R (\sum \mathbf{x}_i)}{N \sum (\mathbf{x}_i^T \mathbf{x}_i) - (\sum \mathbf{x}_i^T)(\sum \mathbf{x}_i)} \quad (11)$$

$$\mathbf{x}_0 = \frac{1}{N} \sum \mathbf{x}_i - \frac{1}{sN} R^T \sum \mathbf{m}_i \quad (12)$$

$$\mathbf{x}' = R\mathbf{x} + \mathbf{t} \quad (13)$$

$$R = \begin{pmatrix} a & -b \\ b & a \end{pmatrix} \quad (14)$$

$$d^2 = \sum_{i=1}^{N} |\mathbf{x}'_i - \mathbf{m}_i|^2_{C_i} = \sum_{i=1}^{N} (R\mathbf{x}_i + \mathbf{t} - \mathbf{m}_i)^T C_i^{-1} (R\mathbf{x}_i + \mathbf{t} - \mathbf{m}_i) \quad (15)$$

$$\begin{pmatrix} \mathbf{a} \\ \mathbf{t} \end{pmatrix} = \begin{pmatrix} \sum C_i^{-1} Y_i, & \sum C_i^{-1} \\ \sum Y_i^T C_i^{-1} Y_i, & \sum Y_i^T C_i^{-1} \end{pmatrix}^{-1} \begin{pmatrix} \sum C_i^{-1} \mathbf{m}_i \\ \sum Y_i^T C_i^{-1} \mathbf{m}_i \end{pmatrix} \quad (16)$$

$$J = \begin{pmatrix} 0 & -1 \\ 1 & 0 \end{pmatrix} \quad (17)$$

$$\mathbf{x}_j = \frac{\mu_i + \mathbf{x}''_i}{2} \quad (18)$$

$$\mathbf{x}_i = \mu_i + \frac{d^2_{obs}}{d^2_{obs} + d^2_{mod}} (\mathbf{x}''_i - \mu_i) \quad (19)$$

$$\mathbf{m}_1 = \begin{pmatrix} 17.5 \\ -13.5 \end{pmatrix} ; \mathbf{m}_2 = \begin{pmatrix} 45.5 \\ -13.5 \end{pmatrix} ; \mathbf{m}_3 = \begin{pmatrix} 31.5 \\ -43.5 \end{pmatrix} \quad (20)$$

$$C_1 = \begin{pmatrix} 18 & 0 \\ 0 & 7 \end{pmatrix} ; C_2 = \begin{pmatrix} 18 & 0 \\ 0 & 7 \end{pmatrix} ; C_3 = \begin{pmatrix} 27 & 0 \\ 0 & 15 \end{pmatrix} \quad (21)$$

TABLE B

COMPONENT FUSION FOR FACE DETECTION

CROSS-REFERENCE TO RELATED APPLICATION

This application claims the benefit of U.S. Provisional Application Ser. No. 60/470,578, filed May 14, 2003, and entitled "Component Fusion for Face Detection in the Presence of Heteroscedastic Noise", which is incorporated herein by reference in its entirety.

BACKGROUND

In typical methods for face detection and/or recognition, it is known that component-based face detection can yield better performance than global approaches, particularly when pose and illumination variations or occlusions are considered. While pose and illumination can significantly change the global face appearance, components are less prone to these changes since the components are smaller than the whole face. The component detectors may accurately locate the face components as well.

The component information may be used to register and normalize the face to a "standard" one, which is appropriate for face recognition. Also, component based methods can be used to build a detector that may handle partial occlusions. Component-based methods have also been used in other areas, such as people detection, for example.

In one prior example, a component-based face detector with a two-level hierarchy of Support Vector Machine ("SVM") classifiers is used. The face components are detected independently with the trained SVMs at the first level. At the second level, a single SVM checks if the geometric locations of the components comply with a face. However, only the largest responses from the component detectors are used when checking the validity of the geometry. Unfortunately, SVMs are relatively slow and it would be quite challenging to employ them in real-time systems.

Another prior example employs four types of rectangular features, and uses AdaBoosting to automatically build a strong classifier from feature-based weak classifiers. This example then computes the integral image to accelerate the computation of features. This gives a high detection rate and a low false detection rate, while the boosted face detector may work in real-time.

Unfortunately, prior fusion methods typically neglect the uncertainties that characterize the component locations, and are generally unsuitable for use in the presence of noise. Accordingly, what is needed is an approach to Component Fusion for Face Detection that is suitable for use in the presence of heteroscedastic noise.

SUMMARY

These and other drawbacks and disadvantages of the prior art are addressed by a system and method of Component Fusion for Face Detection.

The system includes a component detection unit for detecting components in an image, a component fusion unit in signal communication with the component detection unit for fusing the components into an object, and a CPU in signal communication with the detection and fusion units for comparing the fused object with a statistical model.

The corresponding method includes steps for receiving observation data for a plurality of training images, forming at least one statistical model from the plurality of training images, receiving an input image having a plurality of pixels, detecting a plurality of components in the input image, determining a fusion of the detected components, comparing the fusion with the statistical model, and detecting an object in accordance with the comparison.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method of Component Fusion for Face Detection in accordance with the following exemplary tables and figures, in which:

Table A shows equations 1 through 10;

Figure 1:
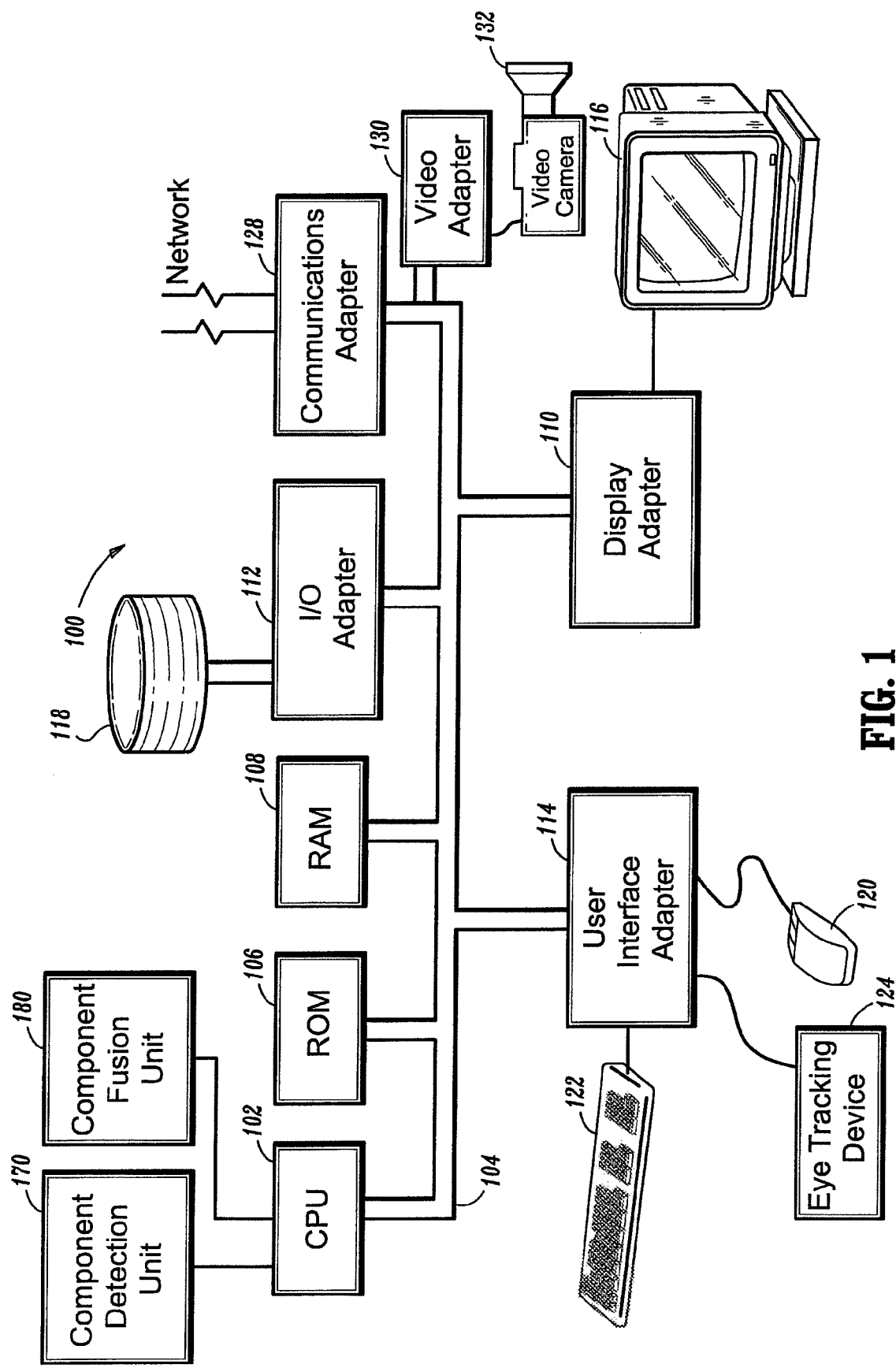
Figure 2:
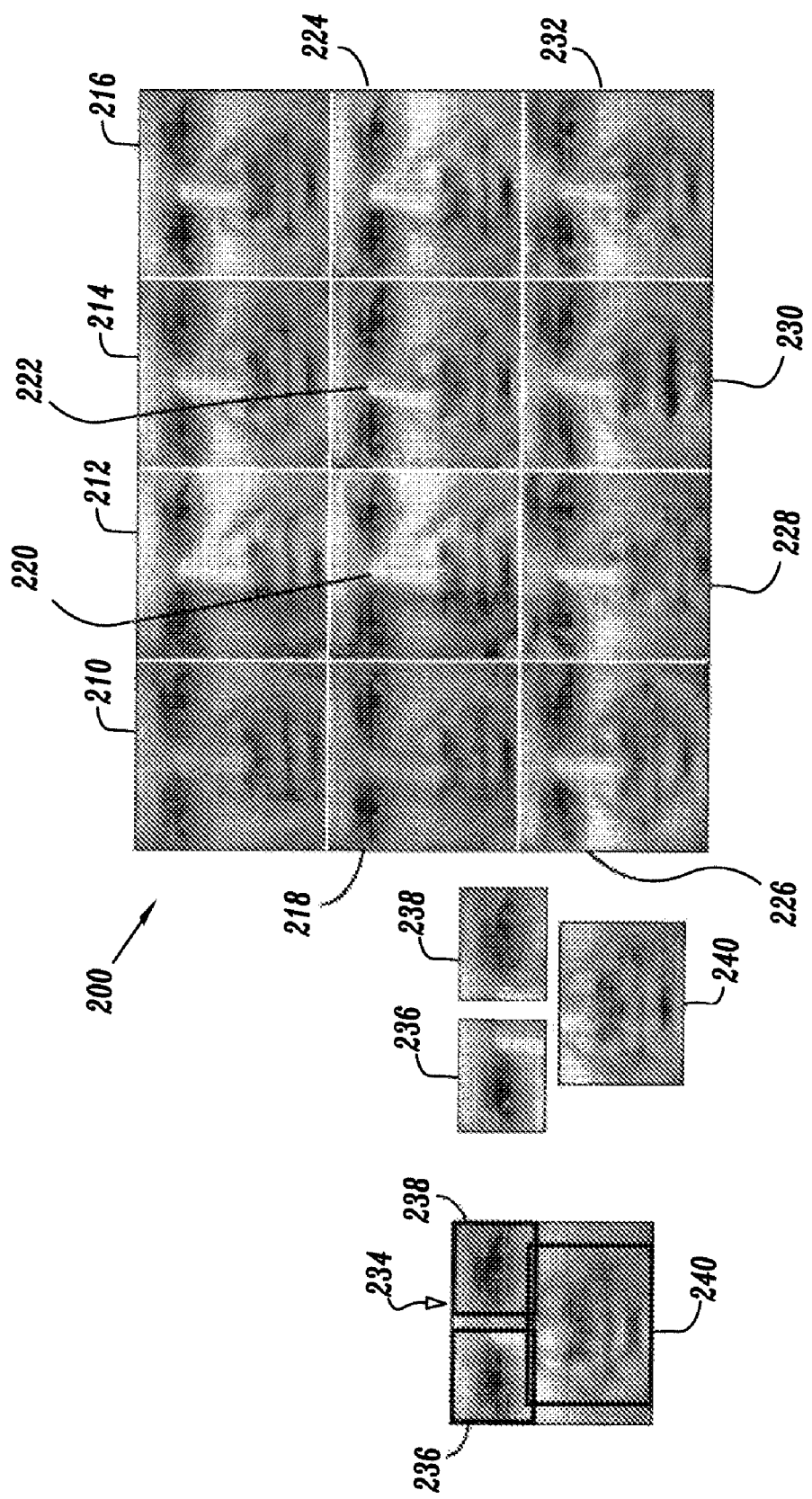
Figure 3:
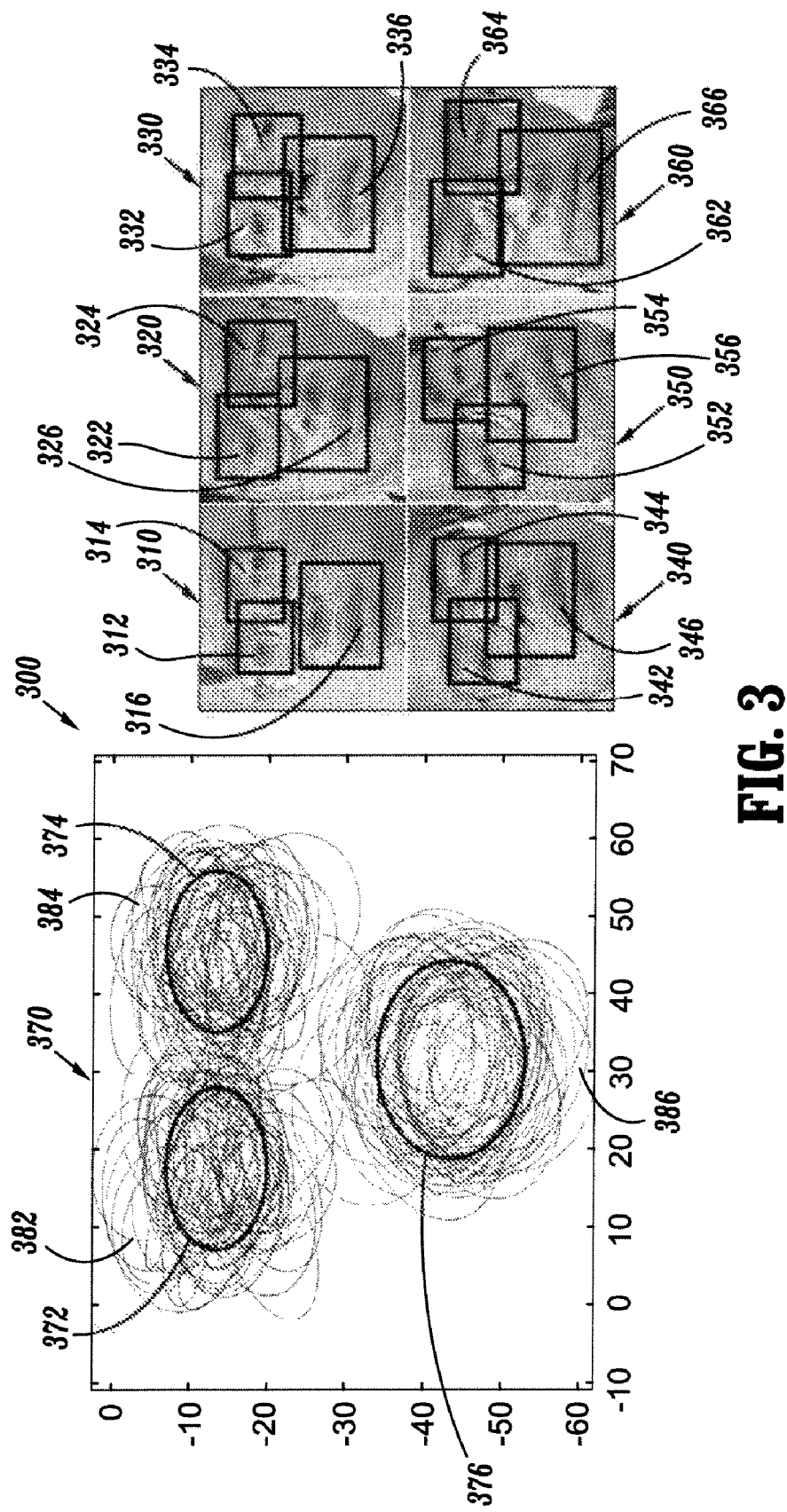
Figure 4:
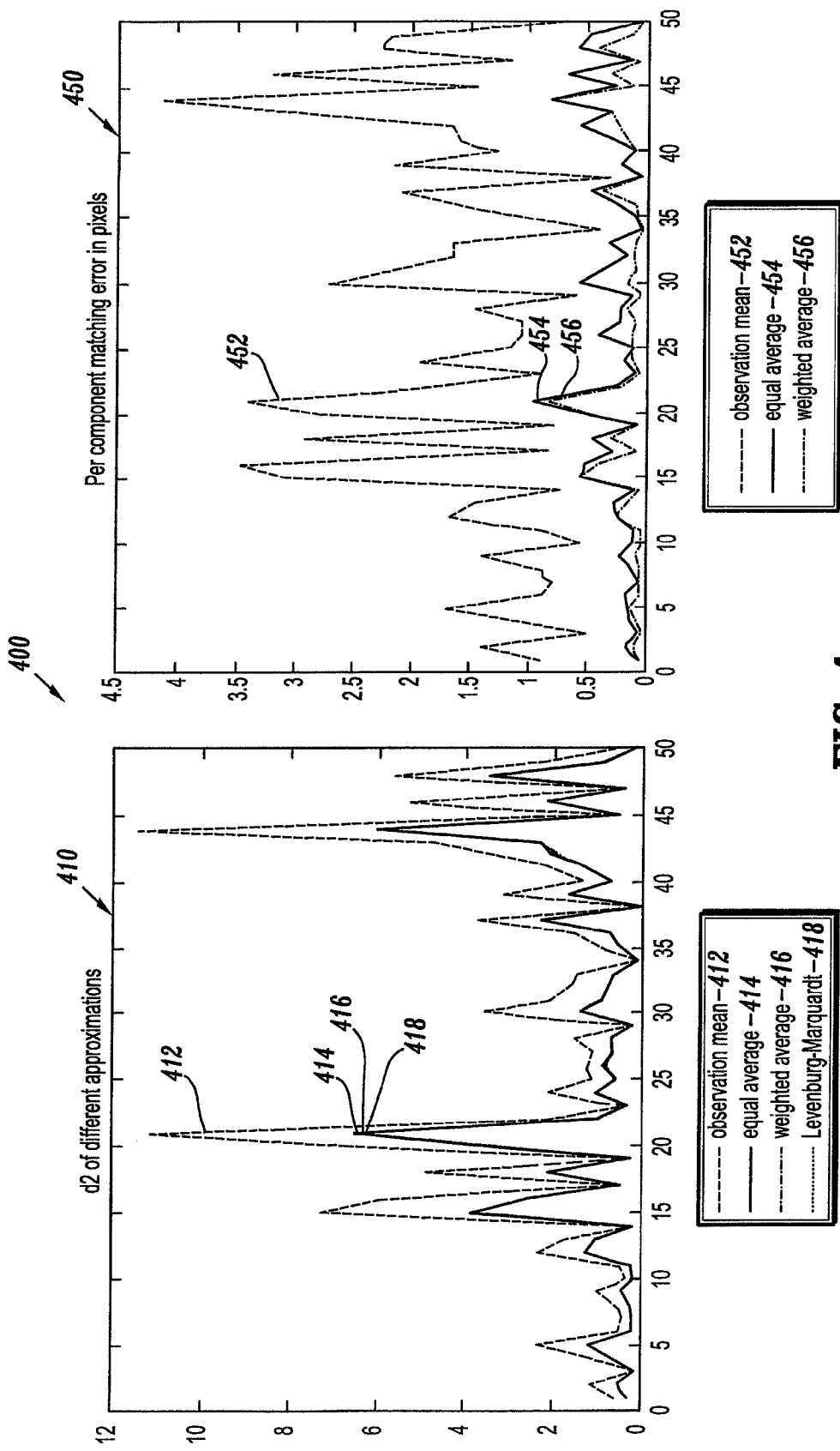

Table B shows equations 11 through 21;

FIG. 1 shows a block diagram of a system for Component Fusion for Face Detection according to an illustrative embodiment of the present disclosure;

FIG. 2 shows image diagrams for face examples and components for use in accordance with the system of FIG. 1;

FIG. 3 shows graphical and image diagrams for observation distributions and corresponding face examples for use in accordance with the system of FIG. 1; and FIG. 4 shows graphical diagrams for evaluation data versus sample number index in accordance with the system of FIG. 1.

DETAILED DESCRIPTION OF PREFERRED EMBODIMENTS

Face detection using components provides results superior to global methods due to its robustness to occlusions, pose and illumination changes. In embodiments of the present disclosure, a first level of processing is devoted to the detection of individual components, while a second level deals with the fusion of the component detectors. Prior fusion methods neglect the uncertainties that characterize the component locations. These uncertainties carry important information that, when exploited, lead to increased face localization accuracy. Preferred embodiments of the present disclosure provide solutions that take geometrical constraints into account. The efficiency and usefulness of these techniques are tested with both synthetic and real world examples.

Thus, the present disclosure provides a new framework for component fusion in the context of the face detection task. The fusion relies on modeling the noise as heteroscedastic, and is constrained by a geometric face model. To achieve real-time performance, exemplary embodiments employ AdaBoosting when training component detectors. However, the presently disclosed framework is not limited to such detectors, and alternate embodiments are open to various types of component detectors, such as Support Vector Machines ("SVMs"), for example.

As shown in FIG. 1, a system for Component Fusion for Face Detection according to an illustrative embodiment of the present disclosure is indicated generally by the reference numeral 100. The system 100 includes at least one processor or central processing unit ("CPU") 102 in signal communication with a system bus 104. A read only memory ("ROM") 106, a random access memory ("RAM") 108, a display adapter 110, an I/O adapter 112, a user interface adapter 114, a communications adapter 128, and a video adapter 130 are also in signal communication with the system bus 104.

A display unit 116 is in signal communication with the system bus 104 via the display adapter 110. A disk storage unit 118, such as, for example, a magnetic or optical disk storage unit, is in signal communication with the system bus 104 via the I/O adapter 112. A mouse 120, a keyboard 122, and an eye tracking device 124 are in signal communication with the system bus 104 via the user interface adapter 114. A video imaging device or camera 132 is in signal communication with the system bus 104 via the video adapter 130.

A component detection unit 170 and a component fusion unit 180 are also included in the system 100 and in signal communication with the CPU 102 and the system bus 104. While the detection unit 170 and the fusion unit 180 are illustrated as coupled to the at least one processor or CPU 102, these components are preferably embodied in computer program code stored in at least one of the memories 106, 108 and 118, wherein the computer program code is executed by the CPU 102.

As will be recognized by those of ordinary skill in the pertinent art based on the teachings herein, alternate embodiments are possible, such as, for example, embodying some or all of the computer program code in registers located on the processor chip 102. Given the teachings of the disclosure provided herein, those of ordinary skill in the pertinent art will contemplate various alternate configurations and implementations of the detection unit 170 and the fusion unit 180, as well as the other elements of the system 100, while practicing within the scope and spirit of the present disclosure.

Turning to FIG. 2, face examples and components for use with the system 100 are indicated generally by the reference numeral 200. The examples include faces 210, 212, 214, 216, 218, 220, 222, 224, 226, 228, 230 and 232, respectively. A face 234 includes potentially overlapping components 236, 238 and 240, representing a right eye component, a left eye component, and a lower face component, respectively. In this exemplary example, the left eye component 236 and the right eye component 238 are each 36 by 28 pixels. The lower face component 240 is 52 by 40 pixels. The face examples in the first row 210-216 and the second row 218-224 are frontal and turning left faces, respectively, with 4 different illumination settings. The face examples in the third row 226-232 show faces with different expressions.

It shall be recognized by those of ordinary skill in the pertinent art that the shapes and sizes of the component areas are merely exemplary. Embodiments of the present disclosure will perform well with components of many contiguous shapes and sizes, without undue experimentation.

Exemplary Component Detectors use three components for a face. All the faces are aligned to a 64 by 64 pixel image. The detectors then use three rectangles to cut three components, left eye 238, right eye 236 and lower face 240, as shown in FIG. 2.

The exemplary face database has 1862 different faces. The images were taken with 5 poses (frontal, turning left, turning right, tilting up, and tilting down) and 4 illumination conditions (dark overall, lighting from left, lighting from right, and bright overall). There are also some faces with different expressions. The face examples 210-232 are from the database. More than 6000 pictures were collected as negative examples for detector training.

The AdaBoosting theory states that by adding weak classifiers one can obtain better strong classifiers. However, in practice, this might not be true since the weak classifiers are often correlated. To deal with this issue, preferred embodiments use a modified AdaBoosting method that trains the component detectors such that the trained strong classifier is verified to be empirically better at each boosting step.

The Component-Based Face Model has many advantages. Suppose we have a probabilistic face model, where each component position has some uncertainty. With the uncertainties, the face model is flexible to describe a variety of possible faces. Assuming Gaussian distributions, in the face model we have a set of 2D points with means $m_i$, and covariance matrices $C_i$, i=1, 2, . . . , N, where N is the number of components. The face model provides a constraint such that the components should comply with the geometrical configurations. That is, the components should not be too far away, as represented by observation distributions such as those of FIG. 3.

The face model is trained from known face examples. We know the exact locations of the components in each training face example, so we can estimate the mean and covariance matrix of each component from these locations.

After the component detectors are trained, we scan the input image to get the component confidence maps, $A_i(x)$, i=1, 2, . . . , N, where x is the location in an image, and N is the number of components. We assume that the confidence map $A_i(x)$ is normalized across all of the components.

With the face model $\{m_i, C_i\}_{i=1,2,\ldots,N}$, the overall face likelihood is described by Equation (1) of Table A, where $\{x'_i\}$ are rigidly transformed from $\{x_i\}$ into the face model space, subject to rotation, translation and scaling. Equations (1) through (10) are provided in Table A.

Note the simple maxima of individual component detector responses are not necessarily best choices for component locations under face model constraints. Our goal is to find the best component localization $\{x_i\}$ with maximal L. We could do an exhaustive search with all $A_i(x)$, but that is generally too computationally expensive.

Since the shape of $A_i(x)$ is often smooth and Gaussian-like, we use a Gaussian shape to approximate it. In other words, the underlying noise model is assumed to be heteroscedastic, i.e., the noise is both anisotropic and inhomogeneous. We can identify the local maximum as $s_i=A_i(\mu_i)$, where $\mu_i$ is the location of maximum and considered the center of the Gaussian shape. A non-parametric method to estimate the "covariance" matrix $Q_i$ in an area B around $\mu_i$ is given by Equation (2) of Table A.

Then the confidence map can be rewritten as Equation (3). Therefore, Equation (4) follows, where Equations (5) and (6) apply. In order to maximize L one should minimize $d^2$. When $d^2$ is computed for an observation, L or ln L can be thresholded to make a detection or rejection decision.

Least square fitting is now addressed. For the beginning, let us simplify the problem so that we only have a fixed-point face model $\{m_i\}$ and fixed-point observations $\{x_i\}$, for example, taking the means of the face model and maxima of the confidence maps. Suppose we find the scaling factor s, the rotation R and translation $x_0$, so that an observation point x can be mapped to a point x' in model space. This is shown by Equation (7), where the rotation matrix R is a function of theta, as shown in Equation (8).

Our goal is to minimize the sum of squared error $d^2$ by choosing the right s, R and $x_0$ as shown in Equation (9). By taking the partial derivatives of Equation (9) with respect to theta, s and $x_0$, and setting them to zeros (denoting $m_i=(m_i, n_i)^T$ and $x_i=(x_i, y_i)^T$), we get the solution defined by Equations (10), (11) and (12), where Equations (11) and (12) are shown in Table B. Equations (11) through (21) are provided in Table B.

Using the above solution, we can evaluate Equation (9) to get the least square error. A smaller $d^2$ suggests a larger similarity between the observation and model geometrical configurations. This simple method does not take the individual component confidences into consideration, or the heteroscedastic model of the noise.

Fitting points to a probabilistic model is now addressed. Within this section, assume that we have a probabilistic model of 2D points $\{m_i, C_i\}_{i=1,2,\ldots,N}$. We want to match the observed points $x_i$ to the model. This case has been analyzed, and here is the summary.

An observation point x can be mapped to a point x' in model space as shown in Equation (13), where $t=(t_x, t_y)^T$ and the scaling and rotation matrix R is given by Equation (14).

Let us denote $a=(a, b)^T$, and the goal is to find the best a and t to minimize the Mahalanobis distance, as shown in Equation (15).

Taking the partial derivatives of Equation (15) with respect to a and t, and setting them to zeros, we get the solution shown in Equation (16), where $Y_i=(x_i, Jx_i)$ and J is defined by Equation (17).

In order to match probabilistic observations to a probabilistic model with the model $\{m_i, C_i\}$ and observation $\{\mu_i, Q_i\}$, i=1, 2, ..., N, we want to find the best choices of component locations $x_i$, and the associated transformation a and t to minimize the combined Mahalanobis distance $d^2$ in Equation (6), where $x'_i$ is a function of $x_i$, a and t according to Equation (13). Unfortunately, it is hard to find the close form solution to this problem, because the partial derivatives are not linear with respect to $x_i$, a and t.

We can use two strategies to solve this optimization problem. One employs numerical optimization methods, such as Levenberg-Marquardt or Newton iterative optimization, which require iterations before convergence.

The other approximates the solution. Notice in Equation (6) there are two terms. The first term is the Mahalanobis distance in the model space, and the second term is the Mahalanobis distance in the observation space. If we pick $\mu_i$ as the solution for $x_i$ (this is the first approximation of the solution, though very rough), and match $\mu_i$ to the probabilistic model $\{m_i, C_i\}_{i=1,2,\ldots,N}$, we end up a biased minimization $d^2_{obs}$ of Equation (6) where the second term is zero. On the other hand, if we pick $m_i$ as the matched points $x'_i$ in the model space, and match $x'_i$ back to the observation $\{\mu_i, Q_i\}_{i=1,2,\ldots,N}$ (denote that the choices in the observation space are $x''_i$), we end up another biased minimization $d^2_{mod}$ of Equation (6) where the first term is zero. The real minimization must be a tradeoff between these two biased ones. The second approximation of the solution we choose is then the equal average as defined by Equation (18).

Further more, we can refine the equal average to get the third approximation, the weighted average approximation, by using the Mahalanobis distances in weighting the average according to Equation (19).

The advantage of the approximations is that they are fast. If the solutions are close to the real minimum, the approximations are more favorable for real-time face detection systems.

Turning now to FIG. 3, observation distributions and corresponding face examples are indicated generally by the reference numeral 300. Here, a real-world face 310 includes a right eye component 312, a left eye component 314, and a lower face component 316. The next real-world face 320 includes a right eye component 322, a left eye component 324, and a lower face component 326. The next real-world face 330 includes a right eye component 332, a left eye component 334, and a lower face component 336. The next real-world face 340 includes a right eye component 342, a left eye component 344, and a lower face component 346. The next real-world face 350 includes a right eye component 352, a left eye component 354, and a lower face component 356. Likewise, the next real-world face 360 includes a right eye component 362, a left eye component 364, and a lower face component 366.

Location distributions 370 include traces (thicker ellipses) representing the distributions of the model for the right eye component 372, the left eye component 374, and the lower face component 376. The location distributions 370 also include traces (thinker ellipses) for 50 synthesized sets of components including right eye components 382, left eye components 384, and lower face components 386, which were randomly generated. In this experiment, we assume a face model where the centers of the left eye, right eye and lower face components are indicated by Equation (20), and the associated covariance matrices are indicated by Equation (21).

We randomly generate observation data by adding noise to both the means and covariance matrices of the components in the face model. A 0-mean Gaussian noise with a standard deviation of 4 pixels is added to both x and y directions of the means, and the covariance matrices are also added with a 0-mean Gaussian noise having a standard deviation of 3. Thus, the face model and observation examples are shown in by the distribution 370.

As shown in FIG. 4, evaluation data versus sample number index plots are indicated generally by the reference numeral 400. The plot 410 shows the $d^2$ computed with various approximations. Results for observation mean 412, equal average 414, weighted average 416, and Levenberg-Marquardt 418 are included. The observation mean approximation has large errors. The equal average and weighted average approximations are very close to the true $d^2$ obtained by Levenberg-Marquardt optimization. The plot 450 shows the distance error of the best match for each component in average in the observation space. Results for observation mean 452, equal average 454, and weighted average 456 are included. We can see small but noticeable displacement errors for the equal and weighted average methods, compared to the plot 410. This suggests that the when $d^2$ is close to the minimum, the $d^2$ surface is quite flat, which is because of the fact that we have-relatively large covariances in the face model and observation examples.

The real world face detection examples 310 through 360 of FIG. 3 are from a video with different poses. In real world examples with AdaBoosting component detectors, an exemplary embodiment face detection system runs comfortably at a frame rate on a standard laptop with 640 by 480 image resolution. The techniques, as tested with these real world examples, successfully handled pose changes as shown with respect to FIG. 3. System embodiments may be applied to other real world data, including standard face databases.

As will be understood by those skilled in the pertinent art, the present disclosure has provided a statistical fusion framework for component-based face detection. The framework has been successfully tested with component face detectors trained using AdaBoosting, and running in real-time. The provided systems and methods are effective with both synthetic and real world data.

The disclosed technique can be applied to many appearance-based image acquisition problems in addition to surveillance images. Alternate examples may include automatic object detection on assembly lines by machine vision, human face detection in security control, and the like. As shall be recognized by those of ordinary skill in the pertinent art, the term "image" as used herein may also represent three-dimensional, four-dimensional, and higher dimensional datasets in alternate embodiments.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central-processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for detecting an object in an object detection device, the method comprising:
   receiving a plurality of training images, at least one of the training images including a plurality of components of an object;
   forming a statistical model from a mean and a covariance matrix of the components of each training image;
   detecting a plurality of components in an input image using a component detector that is trained with the training images;
   determining a covariance matrix for each of the detected components; and
   matching a probabilistic observation comprising the covariance matrixes of the detected components with a probabilistic model comprising the mean and covariance matrixes of the statistical model to detect the object.

2. A method as defined in claim 1, wherein the object is a human face.

3. A method as defined in claim 2 wherein said components are indicative of a left eye, a right eye, and a lower face, respectively.

4. A method as defined in claim 1 wherein said input image is a real-time image.

5. A method as defined in claim 1, further comprising calibrating said statistical model for heteroscedastic noise.

6. A method as defined in claim 1 wherein the components are rectangular areas.

7. A method as defined in claim 1 wherein the training images include examples of the object at a plurality of different poses.

8. A method as defined in claim 1, wherein the component detector is generated using AdaBoosting.

9. A system for object detection, the system comprising:
   observation means for receiving a plurality of training images, at least one of the training images including a plurality of components of an object;
   modeling means for forming a statistical model from a mean and a covariance matrix of the components of each training image;
   a component detection unit for detecting components in an input image, wherein the component detection unit is trained using the training images;
   a component fusion unit in signal communication with the component detection unit for fusing the components; and
   a CPU in signal communication with said detection and fusion units for detecting the object by matching a probabilistic observation comprising the covariance matrixes of the detected components with a probabilistic model comprising the mean and covariance matrix of the statistical model.

10. A system as defined in claim 9, further comprising:
    receiving means for receiving the input image.

11. A system as defined in claim 9, wherein the object is a human face.

12. A system as defined in claim 9 wherein said components are indicative of a left eye, a right eye, and a lower face, respectively.

13. A system as defined in claim 9 wherein said input image is a real-time image.

14. A system as defined in claim 9, further comprising calibration means for calibrating said statistical model for heteroscedastic noise.

15. A system as defined in claim 9, wherein the components are each rectangular areas.

16. A system as defined in claim 9, wherein the fused components are aligned to a predetermined size.

17. A system as defined in claim 9 wherein the training images include examples of the object at a plurality of different poses.

18. A system as defined in claim 9, wherein the component detection unit includes a classifier generated using AdaBoosting to detect the components.

19. A program storage device readable by machine, tangibly embodying a program of instructions executable by the machine to perform method steps for object detection, the method steps comprising:
    forming a statistical model from a mean M and a covariance matrix C of components of known example images;
    scanning locations in an input image using the statistical model to determine component confidence maps;
    identifying a local maximum from the confidence maps, wherein the local maximum has a location U;
    estimating a covariance matrix Q in an area around the local maximum; and
    matching a probabilistic observation comprising the location U and covariance matrix Q with a probabilistic model comprising the mean M and the covariance matrix C to determine whether the input image includes the object.

20. A program storage device as defined in claim 19, wherein the object is a human face.

21. A program storage device as defined in claim 19 wherein said components are indicative of a left eye, a right eye, and a lower face, respectively.

22. A program storage device as defined in claim 19 wherein said input image is a real-time image.

23. A program storage device as defined in claim 19, further comprising a program step for calibrating said statistical model for heteroscedastic noise.

24. A program storage device as defined in claim 19, wherein the components are each rectangular areas.

25. A program storage device as defined in claim 19 wherein the training images include examples of the object at a plurality of different poses.

26. A program storage device as defined in claim 19, wherein the component detector is generated using Ada-Boosting.

27. A method as defined in claim 1, wherein the probabilistic observation includes a location and the covariance matrix of the probabilistic observation is determined by:
   scanning locations in the input image using the statistical model to determine component confidence maps;
   identifying a local maximum from the confidence maps, wherein the local maximum includes the location; and
   estimating the covariance matrix of the probabilistic observation in an area around the local maximum.

* * * * *

UNITED STATES PATENT AND TRADEMARK OFFICE
CERTIFICATE OF CORRECTION

| | |
|---|---|
| PATENT NO. | : 7,602,941 B2 |
| APPLICATION NO. | : 10/842802 |
| DATED | : October 13, 2009 |
| INVENTOR(S) | : Xie et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1207 days.

Signed and Sealed this

Fifth Day of October, 2010

David J. Kappos
*Director of the United States Patent and Trademark Office*